Figure 1:
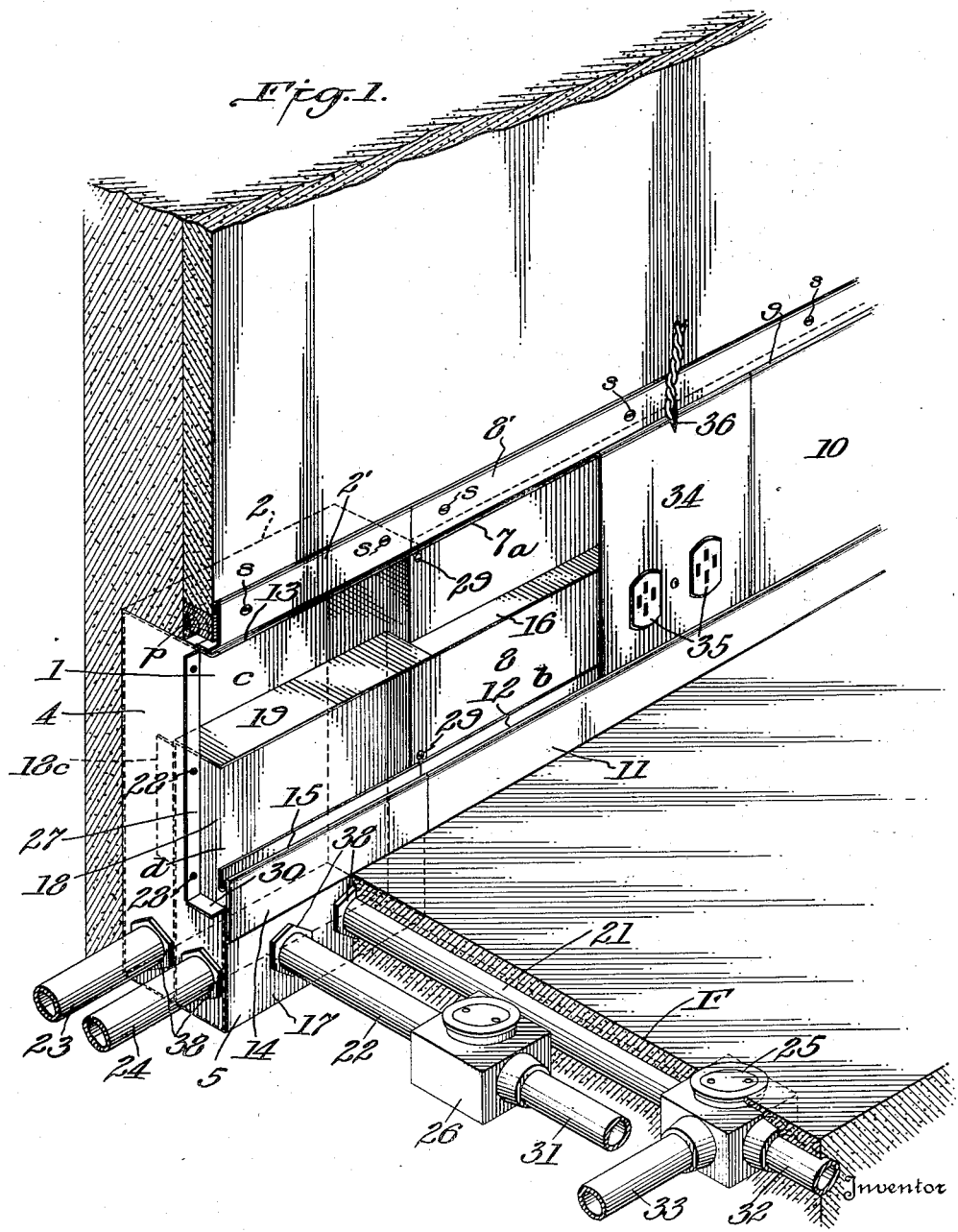

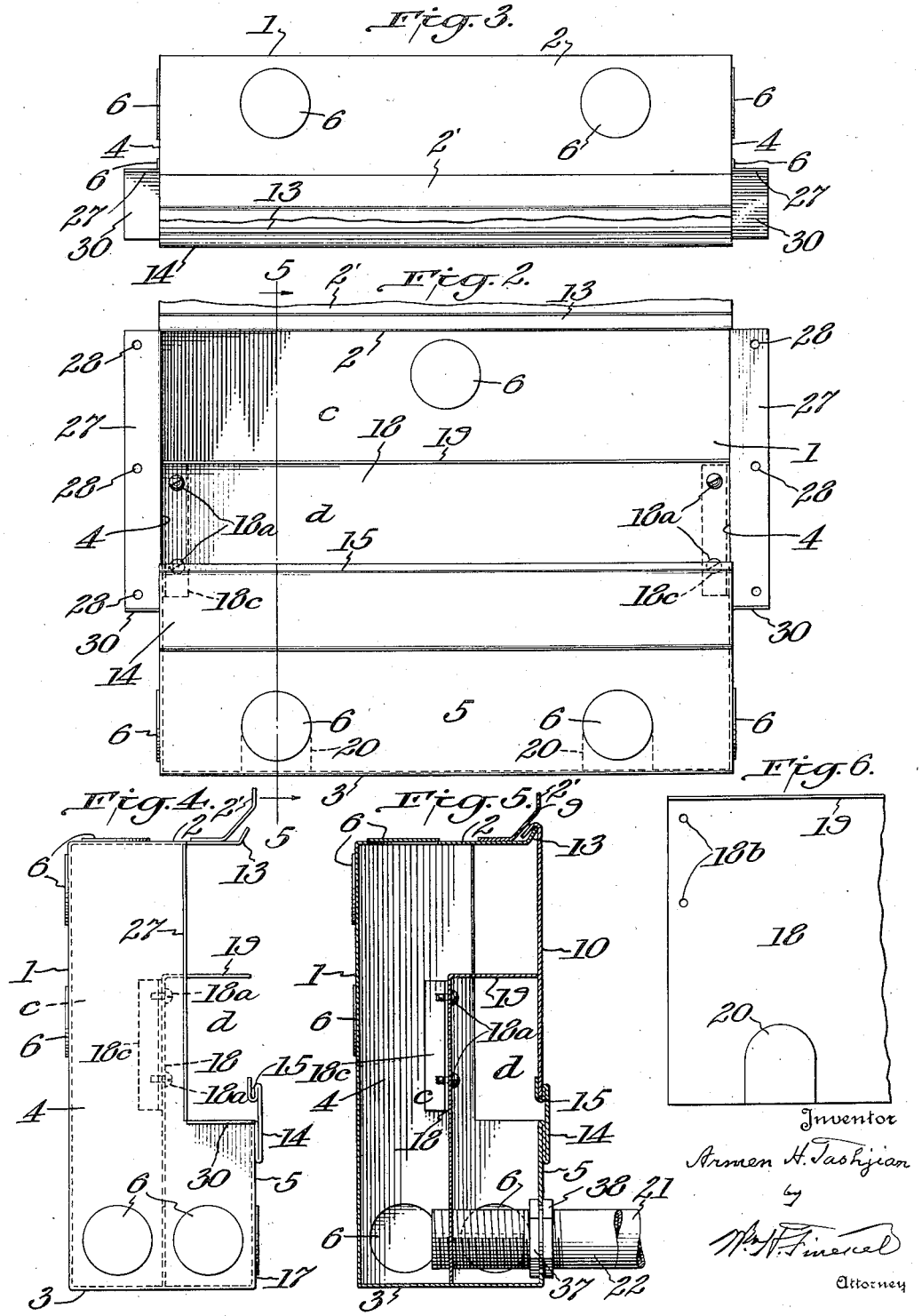

Patented Mar. 17, 1931

1,797,164

UNITED STATES PATENT OFFICE

ARMEN H. TASHJIAN, OF CLEVELAND, OHIO

MEANS FOR INSTALLING AND DISTRIBUTING ELECTRIC CONDUCTORS

Application filed May 26, 1928. Serial No. 280,922.

This invention relates to means for installing and distributing electric conductors, and particularly to a combined junction and conduit-terminal box for use in such installations.

In the installation of base-board conduits, such as that shown and described in my Patent No. 1,437,324, dated November 28, 1922, it was necessary, in order to arrange door-jumpers, floor outlets and connections from one section of the conduit to another, to use conduit elbows and other angle fittings for the purpose of extending the conduit sections below the level of the finished floor. This has been a factor of installation expense and has made the work of installation a more or less tedious operation, requiring a considerable amount of care.

The object of the present invention is the provision of means whereby these objectionable features are obviated and various advantages in ease, rapidity and adaptability of installation are attained.

The invention consists in means for installing and distributing electric conductors, including in combination with a housing or conduit of base-board or similar type a combined junction and conduit-terminal box having a portion extending below the level of the line of the finished floor surface and adapted for connection with it of base-board or the like conduits and of conduits concealed within the walls or floor of the structure with which it is used, as I will proceed now to explain and finally claim.

In the accompanying drawings illustrating the invention, in the several figures of which like parts are similarly designated, Figure 1 is a fragmentary sectional perspective view of the device of my invention embodied in a typical installation, and showing the finished floor level at the right. Fig. 2 is an enlarged front elevation of the combined junction and conduit-terminal box. Figs. 3 and 4 are, respectively, a top plan view and an end elevation of the box. Fig. 5 is a section taken in the plane of line 5—5, Fig. 2, and showing two conduits connected with the box. Fig. 6 is a fragmentary front elevation of the removable partition forming a part of the box.

The combined junction and conduit-terminal box has a back 1, top 2, bottom 3, ends 4 and front 5. These parts, with the exception of the bottom, are provided with conventional knock-outs 6, as shown. Obviously the bottom 3 also may be provided with knock-outs if desired, but as the box is generally used same are not necessary.

The front edge of the top 2 and the upper portion of the front 5 are formed to conform to the mechanical features of assembly, and the ornamental appearance, of the base-board or similar conduit or housing with which the box is to be used. In the instance shown in Fig. 1, the box is used in an installation of base-board conduit such as that disclosed in my co-pending application, filed May 15, 1928, Serial No. 277,991, in which the top of the housing 8 is provided with a plaster mold 8' which may be secured by screws $s$ to the plaster ground $p$, as shown in Fig. 1. The front edge 7 of the top of the housing 8 is turned up at an angle to provide a support for the hooked edge 9 of a face plate 10, and the front of the housing is bent to form a shoe or mop mold 11 provided at its upper portion with a recess 12 to receive and position the lower edge of the face plate 10. Conformably, the top 2 of the box is provided with a plaster mold 2' also secured by screws $s$ to the plaster ground $p$, and the front edge 13 of the top 2 is turned up at an angle to align with the similar edge of the housing 8. Also, the front 5 of the box is provided with a mop or shoe mold 14 and recess 15 to align with and form a continuation of the mop or shoe mold 11 and recess 12 of the housing.

In the form shown, the conduit or housing 8 is provided with two raceways $a$ and $b$, one of which is to contain low tension wires, such as telephone, call button and buzzer lines, and the other to contain high tension wires, such as electric light and power lines, and these two raceways are separated by a partition 16 extending throughout the length of the housing. To accommodate the terminal box to such a housing, it must, obviously, have two separate compartments, and as these compartments must both extend below the level of the finished floor surface F the box is made deeper than the housing and is extended below the floor level, as indicated at 17, Fig. 1. A removable partition 18 arranged substantially midway of the depth of the box divides the space therein into two compartments, and this partition is formed at its top with a shelf-like portion 19 arranged to align with the partition 16 of the housing. By this arrangement it will be seen that two distinct separate compartments *c* and *d* are formed in the box. Both compartments extend below the finished floor level and communicate respectively with the two raceways *a* and *b* of the housing.

As shown, particularly in Figs. 2, 4, 5 and 6, the partition 18 is removable, and may be held in place in the box by screws 18*a* which pass through holes 18*b* in the partition and are threaded into suitable brackets or other retaining means 18*c* carried by the ends 4 of the box. The partition is made removable for the purpose of giving the electrician ample working space within the box for making the necessary arrangement, distribution and connection of conductors, and when such work is finished the partition is so replaced as to properly separate the conductors in their proper compartments, and is fixed in place by the screws 18*a*.

As shown in Figs. 2, 5 and 6, the partition 18 is provided with notched knockouts 20 directly opposite knockouts 6 of the front 5 so that conduits from the front of the box may extend to compartment *c* and yet permit removal of partition 18 without disturbing such conduits.

As will be seen in Fig. 5, when the face plate 10 is in place, compartment *c* and raceway *a* are effectively separated from compartment *d* and raceway *b*.

The portion 17 of the terminal box extends a distance below the level of the finished floor surface F sufficient to permit conduits in the floor fill, such as those indicated at 21, 22, 23 and 24, to enter the compartments *c* and *d* straight without the use of elbows or bends and permit floor outlet fittings such as those shown at 25 and 26 to be arranged flush with the finished floor surface.

The ends 4 of the box are provided with ears or wings 27 having drilled and tapped screw holes 28 by means of which the base-board housing 8 may be secured to the box by screws 29, Fig. 1.

Out-turned extensions 30 are provided to form supports for the bottoms of adjacent portions of the base-board housings.

In installing a combined conduit and housing of the type shown in Fig. 1, around the walls of the room or other space, provided with doors, and other openings, a terminal box is installed and attached to the wall at each side of each door or other opening, with the bottom edge of its shoe or mop mold portion 14 on the exact line to be the surface of the finished floor, and is fixed in such position by means of the plaster mold 2′ and screws *s*. The sections of housing or base-board conduit being similarly arranged, the shoe molds of all will register and the portions 17 of the boxes will extend below the floor level. If required, a box may be similarly installed in line with each point where a floor outlet is to be made. It is obvious, however, that floor outlets may be made by connection of conduits with the terminal boxes used at the sides of the doors or other openings, and branches may be extended from the floor outlet fittings in all directions by means of branch conduits, such as those shown at 31, 32 and 33 in Fig. 1.

As shown in Fig. 5, the conduit 22 leads to compartment *d*, and conduit 21 passes through compartment *d* and communicates with compartment *c*. As it is customary to install the high tension wires in raceway *b* and hence in compartment *d*, the floor outlet 26 will be a light or power outlet, and the low tension wires being customarily confined in raceway *a* and compartment *c*, the floor outlet 25 will be a telephone, buzzer or the like outlet.

At points intermediate the terminal boxes, outlets may be made from the raceways *a* and *b* by means of ready-fitted plate sections 34, as described in my copending application hereinbefore mentioned. These plate sections are provided with standard sockets 35, and are capable of being notched, as shown at 36, to permit egress of wires from the upper raceway *a*.

Conduits, such as 23 and 24, are installed as door jumpers from the two compartments *c* and *d* of the box, respectively, and other leads through partitions, within walls and partitions, and in other conceivable locations, may be made by removing appropriate knock-outs from the walls of the terminal box and connecting conduits with the openings thus formed.

As will be apparent from an inspection of Figs. 1 and 5, the conduits 21, 22, 23, 24, 31, 32 and 33 are of standard form, and may be connected with the front 5 of the terminal box in the usual manner by means of the customary lock nuts 37 and 38.

The openings provided by the knock-outs 6 are of a size sufficient to permit a limited though ample relative adjustment of the terminal box and conduits.

The dimensions of the terminal box are such that the compartments *c* and *d* are spacious enough to give ample room to contain the spliced ends of wires without undue crowding.

It will thus be seen that I provide a means whereby the installation of electric conductors in base-board and similar conduits, or, for that matter, in any arrangement where door jumpers, floor outlets, and other branch conduits are required from such base-board conduits, is greatly facilitated and simplified, and the employment of elbows and other bends, which present installation difficulties, made unnecessary.

Moreover, in the case of a use such as that shown in Fig. 1, the terminal box, having the same structural and ornamental characteristics as the housing forming the base-board, forms, in effect, a part of the housing, and the cover plate therefor may be arranged, without special fitting, along the front of the housing and box in unbroken uniformity.

Furthermore, as previously explained, a portion of the terminal box being arranged below the level of the finished floor surface, all conduits, such as the conduits 21, 22, 23 and 24, which are to be concealed within the floor, may extend straight out from the box in all necessary directions below the level of the floor surface.

Various changes are contemplated as within the spirit of the invention and the scope of the following claims.

What I claim is:—

1. Means for installing and distributing electric conductors in the walls and floor of a room or other space, including a terminal box arranged in the wall and in communication with a raceway therein and having a portion extending below the level of the finished floor, said portion adapted for communication with a conduit in the floor.

2. Means for installing and distributing electric conductors in the walls and floor of a room or other space, including a terminal box arranged in the wall and in communication with a raceway therein and having a portion extending below the level of the finished floor, said portion provided with means for the connection to said box of conduits concealed within the floor.

3. Means for installing and distributing electric conductors in the walls and floor of a room or other space, including the combination with a conductor housing arranged in the wall and having a plurality of raceways, of a terminal box arranged in the wall and in communication with said housing and having a portion extending below the level of the finished floor, said box provided with compartments complemental to and in communication with said raceways and extending into said portion, whereby conduits concealed below the floor may communicate with said compartments.

4. Means for installing and distributing electric conductors relatively to the walls and floor of a room or other space, including a conductor housing forming a base-board and provided with a plurality of conductor raceways, a terminal box complemental to said housing and having a portion extending below the level of the finished floor, said box provided with compartments complemental to said raceways and extending into said portion, means for connecting said box and housing so as to afford communication between the raceways and their complemental compartments, and means in said portion for connecting with said compartments conduits arranged below said finished floor level.

5. Means for installing and distributing electric conductors in the walls and floor of a room or other space, including a housing arranged in the wall and providing a plurality of raceways, a terminal box arranged in the wall and provided with a removable partition dividing the interior of the box into separate compartments in communication with said raceways, said box having a portion extending below the level of the finished floor and said partition extending into said portion, and conduits arranged in said floor and connected with said portion and communicating with said compartments and therethrough with said raceways.

6. Means for installing and distributing electric conductors in the walls and floor of a room or other space, including a terminal box arranged in the wall and having a portion extending below the level of the finished floor, a removable partition arranged within said box and dividing the interior of same into separate conductor-receiving compartments, conduits arranged below the floor level and connected with said portion of the box, one of said conduits extending through said partition and communicating with the compartment behind same, said partition provided with notched knock-outs to permit insertion of said conduit through it and to permit removal of the partition without disturbing said conduit.

7. Means for installing and distributing electric conductors in the walls and floor of a room or other space, including a terminal box positioned in the wall and having a portion extending below the level of the surface of the finished floor, and an ornamental molding on said box above said portion and providing a means for determining the amount of projection of said portion below the floor surface.

8. Means for installing and distributing electric conductors in the walls and floor of a room or other space, including a housing forming a base molding for said walls and having raceways for the reception of electric conductors, a cover plate for said housing serving to close said raceways, means on said housing for supporting said cover plate in raceway-closing position, a terminal box positioned in the wall and having compartments communicating with said raceways, and means on said box similar to and adapted for alignment with the means on said housing for supporting said cover plate on said box, said cover plate adapted to be arranged in adjusted position relatively to said housing and to said terminal box to form a continuous base molding for said walls.

In testimony whereof I have hereunto set my hand this 24th day of May A. D. 1928.

ARMEN H. TASHJIAN.